Patented Dec. 1, 1953

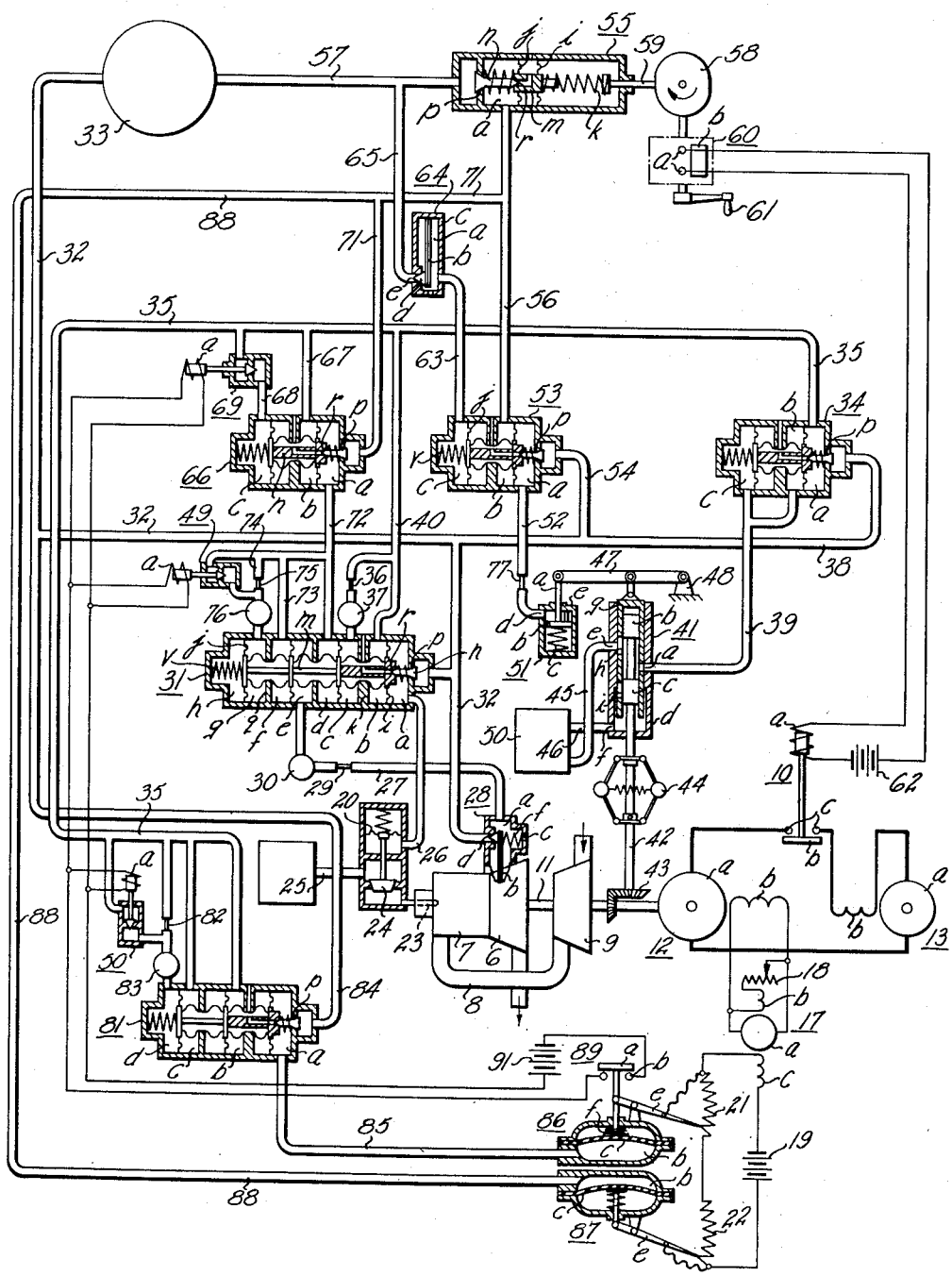

2,661,429

UNITED STATES PATENT OFFICE 2,661,429

COMBINED MANUAL AND SPEED RESPONSIVE GAS TURBINE CONTROL SYSTEM

Harold E. Reichert, New Berlin, Wis., assignor to Allis-Chalmers Manufacturing Company, Milwaukee, Wis.

Application July 13, 1951, Serial No. 236,544

7 Claims. (Cl. 290—2)

1

This invention relates in general to control systems and in particular to control systems for the combustion chambers of gas turbines.

Where a gas turbine is utilized to drive an electric generator for supplying current to a load, such as a traction motor, it is customary to vary the fuel supplied to the turbine combustion chamber and to vary the excitation of the generator to vary the speed and loading of the turbine. In some of such systems a manually operable throttle is utilized to control the flow of fuel to the combustion chamber, and an adjustable governor having a speed setting determined by the throttle setting and responsive to the turbine speed is utilized to control the excitation of the generator. In such systems, it is possible that for a given speed setting of the governor, the governor will be unable to adjust the excitation of the generator to sufficiently load the turbine to maintain the turbine speed at the desired value, with the result that the turbine will overspeed and possibly damage the installation before the overspeed mechanism of the governor shuts the turbine down. To prevent such an occurrence, it is desirable to correlate the governor and the throttle so that, although the governor adjusts the excitation and the throttle controls the fuel during normal operation, the governor is operative to reduce the fuel to reduce the turbine speed if the governor is unable to maintain the set speed by adjustment of the generator excitation.

It is therefore an object of this invention to provide an improved control system for a combustion chamber supplying motive gas to a gas turbine.

It is an additional object of the present invention to provide a control system for a combustion chamber supplying motive gas to a gas turbine driving an electric generator, in which system an adjustable governor normally operative to adjust the excitation of the generator is operative to control the fuel supplied to the combustion chamber to prevent the turbine from overspeeding.

It is a further object of this invention to provide a control system for a combustion chamber supplying motive gas to a gas turbine, in which system the position of the turbine throttle limits the fuel supplied to the combustion chamber independently of the action of the turbine governor.

Objects and advantages other than those set forth above will be apparent from the following description when read in connection with the accompanying drawing, the single figure of which

2 diagrammatically illustrates the circuits and apparatus of one embodiment of this invention.

Referring to the drawing by character of reference, numeral 6 denotes a gas turbine supplied with motive gas from a combustion chamber 7. Chamber 7 is supplied with compressed combustion air through a pipe 8 from a compressor 9 driven by turbine 6 through a shaft 11. Turbine 6 may be utilized to drive any suitable load, such as direct current generator 12 connected to shaft 11 either directly or through suitable reduction gearing. Generator 12 has an armature 12a and a field winding 12b. Armature 12a supplies current to any suitable electrical load, and if the turbine is utilized to drive a locomotive, such load may comprise the armature 13a of a traction motor 13 having a series field winding 13b. Armature 12a is connected to armature 13a and field winding 13b through the contacts 10c of a solenoid relay 10 having a contact bridging member 10b and an operating coil 10a. It will be understood that although only one main generator and one traction motor have been illustrated, additional machines may be provided if required to produce additional traction power.

Field winding 12b of generator 12 is supplied with current from any suitable controllable direct current source, such as the armature 17a of an amplifying exciter 17 having a self-exciting field winding 17b and a control field winding 17c. Field winding 17b is connected across armature 17a in series with an adjustable resistor 18, while field winding 17c is connected in series with a battery 19 and adjustable resistance means in the form of adjustable resistors 21, 22.

Combustion chamber 7 is provided with a fuel burner 23 to which fuel is supplied from a fuel regulating valve 24. Valve 24 is of a conventional type in which the flow of the fuel through the valve from a pipe 25 connected to a fuel source is controlled by a variable control pressure impressed on a valve actuator 20 from a pipe 26. The greater the pressure in pipe 26, the greater is the opening of valve 24 to increase the flow of fuel to burner 23. Pipe 26 is connected to the output chamber 31a of fluid pressure controlled valve 31, herein referred to as a fuel totalizer. The totalizer is provided with flexible diaphragms, such as diaphragms 31i, 31j which, together with adjacent rigid partitions, such as partitions 31k, 31q, form input chambers 31b, 31c, 31d, 31e, 31f, 31g and 31h which are adapted to receive fluid input control pressures for controlling the output pressure in chamber 31a.

The diaphragms are connected together to a movable rod 31m which is moved in response to variations in the algebraic sum of the the input and output pressures acting on the totalizer. During part of its stroke, rod 31m cooperates with a valve stem 31n, which is then fixed, to variably open an exhaust port 31r. During the remainder of its stroke, rod 31m actuates valve stem 31n to control a supply port 31p. When stem 31n is moved to the right by rod 31m, the stem closes exhaust port 31r and opens supply port 31p admitting air to chamber 31a from a pipe 32 connected to a suitable source of air under pressure, such as a reservoir 33. When connecting rod 31m is moved sufficiently to the left, valve stem 31n closes supply port 31p and opens exhaust port 31r to allow air from chamber 31a to escape to atmosphere through a chamber provided in rod 31m and in partition 31k. In an intermediate position, rod 31m maintains both ports 31p, 31r closed. Thus, totalizer 31 acts to add or subtract the pressures in the totalizer input and output chambers to control the output pressure, with movement of rod 31m to the right causing air to be admitted to chamber 31a until the pressure therein increases to a value balancing the algebraic sum of the pressures on the diaphragms, and movement of rod 31m to the left causing a reduction in pressure in chamber 31a until the pressures are again balanced on the diaphragms. A loading spring 31v may be utilize to put an initial bias or loading pressure in chamber 31a.

Input chamber 31e of totalizer 31 receives a control input pressure through a pipe 27 from the output chamber 28a of a thermostatic pressure sending valve 28. Chamber 28a is connected through pipe 32 to reservoir 33 and has an escape orifice 28c to permit chamber 28a to slowly vent to atmosphere. Valve 28 has a bimetallic element 28b which is secured to the valve housing and which is adapted to vary the position of a valve member 28d separating chamber 28a from pipe 32. Bimetallic element 28b is subjected to the temperature of the turbine motive gas at a predetermined point in the turbine, preferably the inlet end thereof. A spring 28f exerts a predetermined biasing force against bimetallic element 28b to maintain valve member 28d closed until the temperature of the turbine motive gas reached a predetermined value. A needle valve 29 and a volume tank 30 are preferably connected in pipe 27 to delay the transmission of pressure changes from chamber 28a to chamber 31e.

Input chambers 31b, 31c have impressed thereon through a pipe 35 and a pipe 40 input pressures from the output chamber 34a of a governor repeater totalizer 34 similar to totalizer 31. This input pressure to chamber 31b is applied directly from pipe 40, while chamber 31c is connected to pipe 40 through a needle valve or restricting orifice 36 and a volume tank 37 to delay the transmission of changes in pressure in pipe 40 to chamber 31c. Supply port 34p is connected to reservoir 33 through a pipe 38 joining pipe 32. Input chambers 34b, 34c of totalizer 34 are connected through a pipe 39 to the output port 41a of an adjustable governor means 41. Governor 41 comprises a shaft 42 driven by shaft 11 through gearing 43 at a speed proportional to the speed of turbine 6. A flyball mechanism 44 on shaft 42 controls the movement of a double piston valve having pistons 41b, 41c reciprocable in the governor housing 41d. Housing 41d is provided with an inlet port 41e connected by a pipe 45 to a suitable source 50 of oil under pressure. Housing 41d is further provided with an exhaust port 41f connected by a pipe 46 returning oil to source 50. A sleeve valve 41g having control ports 41h, 41i is telescopically mounted in housing 41d and is movable therein. Movement of sleeve valve 41g varies the position at which pistons 41b, 41c connect outlet port 41a to inlet port 41e and exhaust port 41f, respectively, to vary the speed setting of the governor.

When turbine 6 is running at the desired speed, pistons 41b, 41c uncover approximately one-half of ports 41h, 41i, respectively, to produce a predetermined output pressure in pipe 39. When turbine 6 is running above the desired speed, flyball mechanism 44 pulls pistons 41b, 41c down to reduce the open area of port 41h and to increase the open area of port 41i to thereby reduce the output pressure to pipe 39. When turbine 6 is running considerably overspeed, piston 41b completely closes port 41h and piston 41c completely opens port 41i to reduce the governor output pressure to zero. On underspeed conditions, the pistons 41b, 41c move upward to thereby increase the output pressure in pipe 39.

Valve 41g is secured to an arm 47 pivoted at one end thereof on a pivot member 48 and connected at the other end thereof to the movable piston rod 51a of a speed setting motor 51. A piston 51b connected to rod 51a is urged upward by a spring 51c and a variable air pressure is admitted to motor 51 above piston 51b through an inlet port 51d to vary the position of arm 47 and sleeve valve 41g in response to variations in the pressure admitted to port 51d. Motor 51 is provided with a projecting stud or stop 51e which limits the upward travel of piston 51b and arm 51a to provide a minimum speed setting for governor 41. Port 51d is connected through a pipe 52 and a restricting orifice 77 to the output chamber 53a of a speed totalizer 53 having input chambers 53b, 53c and a supply port 53p connected to pipe 38 and reservoir 33 through a pipe 54. A spring 53v is provided between the totalizer housing and diaphragm 53f to introduce into the totalizer a predetermined biasing force opposing the input pressures in chambers 53b, 53c.

Input chamber 53b is connected through a pipe 56 to the output chamber 55a of manually operable pneumatic throttle valve means 55 having a supply port 55p connected to reservoir 33 through a pipe 57. Throttle valve means 55 is similar in operation to totalizers 31, 34, 53, in that the output pressure in chamber 55a is dependent upon the pressures acting against the diaphragms 55i, 55j. Diaphragms 55i, 55j are urged to the left by a spring 55k which is compressed a variable amount by a rotatable cam 58 and a follower 59. Diaphragms 55i, 55j are secured to a movable member 55m having an exhaust port 55r communicating with atmosphere and adapted to be variably opened by stem 55n. Movement of the diaphragms to the left closes exhaust port 55r and opens supply port 55p to admit air to chamber 55a and pipe 56 until the pressures on diaphragms 55i, 55j are balanced, causing the diaphragms to move to the right to close the supply port 55p. Similarly, a decrease in the pressure of spring 55k causes the diaphragms to move to the right to open exhaust port 55r to exhaust pressure in chamber 55a to atmosphere until the pressures on the diaphragms are again balanced.

Cam 58 is rotated by a throttle handle 61 operable by the engineer or operator of the turbine.

The lowest fuel position of throttle handle 61 is the idling position, during which spring 55k is compressed a predetermined amount to produce a predetermined minimum output pressure in chamber 55a. The output pressure in chamber 55a increases from this predetermined minimum value as throttle handle 61 is moved from the idling position, so that throttle 55 produces in output chamber 55a a control pressure which increases with the extent of movement of throttle handle 61 from the lowest fuel position. Movement of throttle handle 61 also actuates a switch 60 having contacts 60a and a segment 60b. Movement of throttle handle 61 causes segment 60b to engage contacts 60a to connect coil 10a of relay 10 to a battery 62.

Input chamber 53c of speed totalizer 53 is connected through a pipe 63 to the output chamber 64a of an ambient thermostatic pressure sending valve 64. Valve 64 has a bimetallic element 64b secured to valve housing 64c and adapted to vary the opening of a valve member 64d controlling an exhaust port 64e in response to variations in the ambient temperature. Chamber 64a is connected through a pipe 65 and pipe 57 to reservoir 33, and variations in the position of valve member 64d vary the area of the escape orifice of atmosphere exhaust port 64e to thereby vary the pressure transmitted to chamber 53c through pipe 63 in response to variations in the ambient temperature.

A fuel guard totalizer 66 having an output chamber 66a, a pair of input chambers 66b, 66c and a supply port 66p is provided to aid in controlling the output of fuel totalizer 31. Input chamber 66b is connected through a pipe 67 and pipe 35 to the output chamber 34a of governor repeater totalizer 34, and input chamber 66c is connected to pipe 35 and chamber 34a through a pipe 68 having a solenoid valve 69 therein. Valve 69 has an operating coil 69a which, when energized, opens valve 69 to transmit pressure from pipe 35 to chamber 66c. Supply port 66p of totalizer 66, instead of being connected to reservoir 33, is connected through a pipe 71 and pipe 56 to output chamber 55a of throttle valve 55, so that the pressure in output chamber 66a is limited by the output pressure of throttle valve 55. Output chamber 66a is connected through pipes 72, 73 to input chambers 31d, 31f, respectively, of fuel totalizer 31. Branch pipe 74 also connects chamber 66a to opposing input chamber 31g through a restricting orifice 75 and a volume tank 76. A solenoid bypass valve 49 having an operating coil 49a is connected to pipe 74 to bypass orifice 75 upon energization of coil 49a.

The output pressure from governor repeater totalizer 34 is transmitted through pipes 35 and 49 to fuel totalizer 31 and to the input chambers 81b, 81c, 81d of an excitation totalizer 81. Pipe 35 is connected directly to input chambers 81b, 81c and is connected through a restricting orifice 82 and a volume tank 83 to chamber 81d. A solenoid bypass valve 50 similar to valve 49 is connected across restricting orifice 82 to bypass this orifice upon energization of coil 50a. Totalizer 81 has a supply port 81p connected to reservoir 33 through a pipe 84, and has an output chamber 81a connected through a pipe 85 to the input chamber 86b of a pneumatic positioner 86. Positioner 86 has a flexible diaphragm 86c connected to an arm 86e forming an adjustable tap on resistor 21. The movement of diaphragm 86c is controlled by the difference between the input pressure in chamber 86b and the pressure exerted by a spring 86f, so that the resistance of resistor 21 is varied in response to variations in the output pressure of totalizer 81. Arm 86e also carries a bridging member 89a adapted to close contacts 89b of a switch 89 for connecting coils 49a, 50a, 69a to a battery 91 to cause valves 49, 50, 69 to open upon predetermined movement of arm 86e. A similar pneumatic positioner 87 having a diaphragm 87c and an arm 87e is provided to adjust the resistance of resistor 22. Input chamber 87b is connected through a pipe 88 to pipe 71 and the output chamber 55a of throttle valve 55.

The turbine is operated in two phases, during the first of which the turbine speed is held constant at a predetermined minimum value and the temperature of the motive gas supplied to the turbine is increased to increase the turbine power. When the motive gas temperature reaches a predetermined maximum value, the turbine enters the second phase of its operation during which the motive gas temperature is maintained constant at the predetermined maximum value and the turbine speed is increased to increase turbine power. The turbine is started from rest by suitable turning gear (not shown) and when the turbine becomes self-sustaining, the turbine may be loaded by movement of throttle handle 61 from the idling position.

In the idling position, cam 58 compresses spring 55k the predetermined amount to produce the predetermined minimum output pressure in chamber 55a. This output pressure is transmitted through pipe 56 to input chamber 53b of speed totalizer 53, and chamber 53c receives a control input pressure from ambient thermostatic sender 64. These pressures tend to increase the output pressure in chamber 53a to increase the speed setting of governor 41, but spring 53v introduces a predetermined biasing force into totalizer 53 opposing the pressures in chambers 53b, 53c, so that the output pressure of totalizer 53 does not increase until the sum of the pressures in chambers 53b, 53c exceeds the pressure of spring 53v. Therefore, stop 51c maintains governor 41 at its predetermined minimum speed setting.

The governor hydraulic output pressure is transmitted through pipe 39 to chambers 34b, 34c of repeater totalizer 34 where the hydraulic pressure is converted to a pneumatic output pressure in chamber 34a. The pressure from chamber 34a is transmitted through pipes 35, 67 to input chamber 66b of fuel guard totalizer 66 to control the output pressure in chamber 66a. It will be noted that the output pressure of totalizer 66 is limited by the position of throttle handle 61, since the output pressure from throttle valve 55 is supplied to supply port 66p. The output pressure from chamber 66a is impressed on input chamber 31d of the fuel totalizer 31 to control the output pressure in chamber 31a. The pressure in chamber 31a is transmitted through pipe 26 to actuator 25, to cause valve 24 to supply to burner 23 the fuel required to maintain the speed of the turbine at the predetermined minimum value set by the governor. In the idling position, contacts 60a of switch 60 are not closed so that armature 13a and field winding 13b are not energized and motor 13 does not rotate.

When throttle handle 61 is moved from the idling position to the first traction position, contacts 60a close to connect armature 13a and field winding 13b to armature 12a, causing rotation of motor 13. This throttle movement also produces an increase in throttle output pressure which supplies a transient excess in fuel signal to chambers 31d, 31f of fuel totalizer 31 through fuel guard totalizer 66 to aid the turbine in rapidly developing the horsepower required to meet the new load. The effect of this transient fuel increase is gradually canceled by the buildup of pressure in opposing chamber 31g through restricting orifice 75 and volume tank 76. At the same time, pressure from throttle valve 55 is transmitted through pipes 71, 86 to chamber 87b of positioner 87 to cause movement of diaphragm 87c for decreasing the amount of resistor 22 connected in series with field winding 17c. This action increases the voltage of armature 12a to increase the loading of turbine 6. Turbine 6 consequently slows down below the minimum speed setting and governor 41, sensing an underspeed condition, increases the output pressure in pipe 39. This pressure increase successively increases the output pressures of totalizers 34, 66, 31, as described above, to increase the fuel supplied to burner 23 to meet the new power requirements.

The above increase in output pressure from governor repeater totalizer 34 is also impressed directly on chamber 31b of totalizer 31 where it causes a transient increase in output pressure in pipe 20 and a transient increase in fuel to burner 23 to prevent the turbine speed from falling too far below the set value before the increased pressure from fuel guard totalizer 66 is effective to increase fuel. This transient effect in chamber 31b is canceled by the gradual buildup of pressure in opposing chamber 31c through needle valve 86 and volume tank 87.

As the throttle is advanced further to call for more turbine power, positioner arm 87c moves along resistor 22 to increase turbine loading and power until all of the resistance of resistor 22 is removed from the circuit of field winding 17c. If the amount of fuel which fuel guard totalizer 66 and fuel totalizer 31 permit to flow to burner 23 is insufficient to maintain the turbine speed at the desired value under the increased load, governor 41 will sense an underspeed condition and therefore increase the output pressure in pipe 39 and repeater totalizer 34. This increased pressure is transmitted from totalizer 34 through pipe 35 to chambers 81b, 81c, 81d of excitation totalizer 81 where it acts to decrease the pressure in output chamber 81a.

A decrease in the pressure of output chamber 81a permits spring 86f to push diaphragm 86c downward to thereby increase the amount of resistor 21 connected in circuit with field winding 17c. This action reduces the current in field winding 17c to decrease the loading of turbine 6 and thereby permit the turbine to come up to the desired speed. The pressure change in pipe 35 is impressed directly on chambers 81b, 81c and is impressed on chamber 81d through needle valve 82 and volume tank 83 to produce a transient over-correction of the resistance of resistor 21 to aid in rapidly bringing the turbine to the desired speed.

When arm 86c moves from its all-resistance-out position shown in the drawing, bridging member 86a closes contacts 86b to connect coils 49a, 50a and 69a to battery 91. This action opens valves 49 and 50 to bypass needle valves 75 and 82 to thereby eliminate the transient fuel and excitation changes described above. Closure of contacts 86b also causes opening of valve 69 to permit air from pipe 35 to enter input chamber 66c. This action doubles the pressure forcing stem 66n to open supply port 66p so that this port is maintained open to permit air pressure from throttle valve 55 to go directly through pipe 71, supply port 66p, output chamber 66a and through pipe 72 to fuel totalizer 31. This results in transferring fuel control from the governor to the throttle, although the governor is still operative to control fuel in case of extreme overspeed, as will be described hereinafter. It will be understood from the description thus far that until valve 69 opens, the fuel rate to burner 23 is controlled by the governor rather than by the throttle. This is so because the minimum output pressure from throttle valve 55 is great enough to set a fuel rate in excess of that required to maintain the turbine at the predetermined minimum speed, so that the governor cuts back the fuel rate by permitting only a portion of the throttle valve output pressure to pass through fuel guard totalizer 66 to fuel totalizer 31.

The above described increases in fuel raise the temperature of the motive gases in combustion chamber 7 and turbine 6, and as throttle handle 61 is advanced further, the temperature of the motive gas at the inlet end of the turbine reaches the maximum value to which the turbine may be subjected. The position of throttle handle 61 at which this maximum inlet temperature is reached varies with the ambient temperature, the maximum temperature being reached at a higher throttle position and throttle valve output pressure when the ambient temperature is low than when the ambient temperature is high. Thermostatic sender 64, throttle 55 and speed totalizer 53 are so designed and adjusted that the turbine motive gas is always at the predetermined maximum temperature when the pressures in chambers 53b, 53c exceed the pressure of bias spring 53v by the predetermined amount required to change the governor speed setting from the minimum value. Thus, the turbine transfers from the first phase of operation to the second phase of operation when the motive gas reaches the predetermined maximum temperature, which is independent of throttle position.

When the turbine temperature reaches the predetermined maximum value, further movement of throttle handle 61 increases the output pressure of throttle valve 55 to increase the pressure in chamber 53b. However, this pressure increase in chamber 53b is not transmitted immediately to motor 51 to increase the setting of governor 41 owing to the delaying effect of orifice 77. This increased throttle movement also increases the pressure transmitted through pipe 71 to fuel guard totalizer 66 and fuel totalizer 31 to increase the fuel supplied to burner 23. Any increase in fuel to burner 23 will tend to increase the turbine temperature above the maximum value and thermostatic sender 28 therefore tends to increase the pressure in pipe 27 and chamber 31e to decrease the fuel to burner 23. However, restricting orifice 29 and volume tank 30 delay the transmission of this increased pressure so that sender 28 does not immediately act to reduce the fuel. Thus, the increased power made available by the increased temperature is utilized to accelerate the turbine to the increased speed. Restricting orifice 77 between totalizer 53 and motor 51 is so adjusted that the governor speed setting is increased simultaneously with the increase in turbine speed occasioned by the increased fuel and temperature, so that the governor output pressure does not change during this fuel and speed increase.

Thus, throttle valve 55 and governor 41 act jointly to vary the power delivered by the turbine in response to movement of throttle handle 61. Although throttle valve 55 is normally operative to control the fuel to burner 23, governor 41 may reduce the burner fuel under certain conditions. If the turbine overspeeds or when throttle handle 61 is moved to a decreased speed position, governor 41 normally increases the excitation of generator 12 to increase the turbine loading to return the speed to the desired value. However, if the governor is unable to return the turbine speed to the desired value, even when all the resistance of resistor 21 is removed from the field circuit, and the turbine continues to overspeed, the output pressure from governor 41 and governor repeater totalizer 34 drops to zero. This action reduces the pressure in input chambers 66b, 66c of the fuel guard totalizer to zero, causing closing of supply port 66p and opening of exhaust port 66r to reduce the pressure in pipe 72 and input chamber 31d to zero. This in turn reduces the output pressure in chamber 31a to reduce the fuel to burner 23 and thereby return the turbine to the desired speed.

Thermostatic sender 28 is operative to reduce the burner fuel if the turbine temperature tends to exceed the predetermined maximum value. Needle valve 29 and volume tank 30 delay the transmission of changes in air pressure from sender 28 to chamber 31e so that sender 28 does not operate to limit the opening of fuel valve 24 during transient increases in the temperature of the turbine motive gas above the predetermined maximum value, such as are encountered during acceleration and deceleration of the turbine.

To reverse the locomotive, any suitable known means may be provided to reverse the direction of current flow in field winding 13b with respect to its direction for forward movement, so that motor armature 13a rotates in the opposite direction. The remainder of the operation of the system for reverse movement of the locomotive is the same as that described above for forward movement.

Although but one embodiment has been illustrated and described, it will be apparent to those skilled in the art that various changes and modifications may be made therein without departing from the spirit of the invention or from the scope of the appended claims. Features disclosed but not claimed herein are claimed in application of Stanley W. James, Serial Number 240,013, filed August 2, 1951, now Patent Number 2,636,130, issued April 21, 1953.

It is claimed and desired to secure by Letters Patent:

1. In a control system for a combustion chamber supplying motive gas to a gas turbine, the combination of a source of air under pressure, a fuel regulating valve, operating means for said valve connectable with said source to cause said valve to be variably opened for controlling the flow of fuel to said chamber, a pneumatic totalizing device having an input chamber, an output chamber and a supply port communicating with said output chamber, said input chamber being adapted to receive a control pressure for controlling the pressure transmitted from said supply port to said output chamber, regulating means including an adjustable governor and a second pneumatic totalizing device for producing a first control pressure dependent upon the speed of said turbine, a manually operable throttle connected to said source for producing a second control pressure which increases with the extent of movement of said throttle from the cutoff position, means connecting said regulating means to said input chamber to impress said first control pressure thereon, means connecting said throttle to said supply port to impress said second control pressure thereon, and means connecting said output chamber to said fuel valve operating means to control the opening of said valve in response to variations in the pressure in said output chamber, whereby said fuel valve is adjusted by said governor to a variable position within a range extending from closed position to a limit position which varies with the position of said throttle independently of the action of said governor.

2. In a control system for a combustion chamber supplying motive gas to a gas turbine, the combination of a source of air under pressure, a fuel regulating valve, operating means for said valve connectable with said source to cause said valve to be variably opened by air from said source for controlling the flow of fuel to said chamber, a first pneumatic totalizing device having an input chamber, an output chamber and a supply port communicating with said output chamber, said input chamber being adapted to receive a control pressure for controlling the pressure transmitted from said supply port to said output chamber, an adjustable governor for producing a hydraulic pressure dependent upon the speed of said turbine, a second pneumatic totalizing device connected to said source for converting said hydraulic pressure to a first pneumatic control pressure, a manually operable throttle connected to said source for producing a second control pressure which increases with the extent of movement of said throttle from the cutoff position, means connecting said second totalizing device to said input chamber to impress said first control pressure thereon, means connecting said throttle to said supply port to impress said second control pressure thereon, and means connecting said output chamber to said fuel valve operating means to control the opening of said valve in response to variations in the pressure in said output chamber, whereby said fuel valve is adjusted by said governor to a variable position within a range extending from closed position to a limit position which varies with the position of said throttle independently of the action of said governor.

3. In a control system for a combustion chamber supplying motive gas to a gas turbine driving an electric generator, the combination of a source of air under pressure, a fuel regulating valve, operating means for said valve connectable with said source to cause said valve to be variably opened by air from said source for controlling the flow of fuel to said chamber, a pneumatic totalizing device having an input chamber, an output chamber and a supply port communicating with said output chamber, said input chamber being adapted to receive a control pressure for controlling the pressure transmitted from said supply port to said output chamber, regulating means including an adjustable governor and a second pneumatic totalizing device for producing a first control pressure dependent upon the speed of said turbine, a manually operable throttle connected to said source for producing a second control pressure which increases with the extent of movement of said throttle from the cutoff position, means connecting said regulating means to said input chamber to impress said first control pressure thereon, adjustable resistance means for controlling the excitation of said generator, pneumatic means for controlling the resistance of said resistance means, means connecting said throttle to said pneumatic means to vary the loading of said turbine in response to variations in said second control pressure, means connecting said throttle to said supply port to impress said second control pressure thereon, and means connecting said output chamber to said fuel valve operating means to control the opening of said valve in response to variations in the pressure in said output chamber, whereby said fuel valve is adjusted by said governor to a variable position within a range extending from closed position to a limit position which varies with the the position of said throttle independently of the action of said governor.

4. In a control system for a combustion chamber supplying motive gas to a gas turbine, the combination of a source of air under pressure, a fuel regulating valve, operating means for said valve connectable with said source to cause said valve to be variably opened by air from said source for controlling the flow of fuel to said chamber, a first pneumatic totalizing device having an input chamber, an output chamber and a supply port communicating with said output chamber, said input chamber being adapted to receive a control pressure for controlling the pressure transmitted from said supply port to said output chamber, regulating means including an adjustable governor and a second pneumatic totalizing device for producing a first control pressure dependent upon the speed of said turbine, a manually operable throttle connected to said source for producing a second control pressure which increases with the extent of movement of said throttle from the cutoff position, means connecting said regulating means to said input chamber to impress said first control pressure thereon, means connecting said throttle to said supply port to impress said second control pressure thereon, a third pneumatic totalizing device connected to said source for controlling the opening of said valve, and means connecting said output chamber to said third totalizing device to control the opening of said valve in response to variations in the pressure in said output chamber, whereby said fuel valve is adjusted by said governor to a variable position within a range extending from closed position to a limit position which varies with the position of said throttle independently of the action of said governor.

5. In a control system for a combustion chamber supplying motive gas to a gas turbine driving an electric generator, the combination of a source of air under pressure, a fuel regulating valve, operating means for said valve connectable to said source to cause said valve to be variably opened by air from said source for controlling the flow of fuel to said chamber, a pneumatic totalizing device having an input chamber, an output chamber and a supply port communicating with said output chamber, said input chamber being adapted to receive a control pressure for controlling the pressure transmitted from said supply port to said output chamber, regulating means including an adjustable governor and a second pneumatic totalizing device for producing a first control pressure dependent upon the speed of said turbine, said first control pressure decreasing when said turbine speed increases, a manually operable throttle connected to said source for producing a second control pressure which increases with the extent of movement of said throttle from the cutoff position to set a desired turbine speed, adjustable resistance means for varying the excitation of said generator, pneumatic means for varying the resistance of said resistance means, a third pneumatic totalizing device, means connecting said pneumatic means to said third pneumatic totalizing device, means for impressing said first control pressure on said third pneumatic totalizing device for varying the loading of said turbine in response to variations in said first control pressure, means connecting said regulating means to said input chamber to impress said first control pressure thereon, means connecting said throttle to said supply port to impress said second control pressure thereon, and means connecting said output chamber to said fuel valve operating means to control the opening of said valve in response to variations in the pressure in said output chamber, whereby said governor is operative to decrease said first control pressure for reducing the opening of said fuel valve if the adjustment of said resistance means produces insufficient loading of said turbine to maintain said turbine at the set speed.

6. In a control system for a combustion chamber supplying motive gas to a gas turbine driving an electric generator, the combination of a source of air under pressure, a fuel regulating valve, operating means for said valve connectable to said source to cause said valve to be variably opened by air from said source for controlling the flow of fuel to said chamber, a first pneumatic totalizing device having an input chamber, an output chamber and a supply port communicating with said output chamber, said input chamber being adapted to receive a control pressure for controlling the pressure transmitted from said supply port to said output chamber, an adjustable governor for producing a hydraulic pressure dependent upon the speed of said turbine, said hydraulic pressure decreasing when said turbine speed increases, a second pneumatic totalizing device connected to said source and to said governor for converting said hydraulic pressure to a first pneumatic control pressure, a manually operable throttle connected to said source for producing a second control pressure which increases with the extent of movement of said throttle from the cutoff position to set a desired turbine speed, adjustable resistance means for varying the excitation of said generator, pneumatic means for varying the resistance of said resistance means, a third pneumatic totalizing device, means connecting said pneumatic means to said third pneumatic totalizing device, means for impressing said first control pressure on said third pneumatic totalizing device for varying the loading of said turbine in response to variations in said first control pressure, means connecting said second pneumatic totalizing device to said input chamber to impress said first control pressure thereon, means connecting said throttle to said supply port to impress said second control pressure thereon, and means connecting said output chamber to said fuel valve operating means to control the opening of said valve in response to variations in the pressure in said output chamber, whereby said governor is operative to decrease said first control pressure for reducing the opening of said fuel valve if the adjustment of said resistance means produces insufficient loading of said turbine to maintain said turbine at the set speed.

7. In a control system for a combustion chamber supplying motive gas to a gas turbine driving an electric generator, the combination of a source of air under pressure, a fuel regulating valve, operating means for said valve connectable to said source to cause said valve to be variably opened by air from said source for controlling the flow of fuel to said chamber, a pneumatic totalizing device having an input chamber, an output chamber and a supply port communicating with said output chamber, said input chamber being adapted to receive a control pressure for controlling the pressure transmitted from said supply port to said output chamber, means including an adjustable governor and a second pneumatic totalizing device for producing a first control pressure dependent upon the speed of said turbine, said first control pressure decreasing when said turbine speed increases, a manually operable throttle connected to said source for producing a second control pressure which increases with the extent of movement of said throttle from the cutoff position to set a desired turbine speed, adjustable resistance means for varying the exicitation of said generator, pneumatic means for varying the resistance of said resistance means, a third pneumatic totalizing device, means connecting said pneumatic means to said third pneumatic totalizing device, means for impressing said first control pressure on said third pneumatic totalizing device for varying the loading of said turbine in response to variations in said first control pressure, means connecting said second pneumatic totalizing device to said input chamber to impress said first control pressure thereon, means connecting said throttle to said supply port to impress said second control pressure thereon, a fourth pneumatic totalizing device connected to said source and to said output chamber, and means connecting said fourth pneumatic totalizing device to said fuel valve operating means to control the opening of said valve in response to variations in the pressure in said output chamber, whereby said governor is operative to decrease said first control pressure for reducing the opening of said valve if the adjustment of said resistance means produces insufficient loading of said turbine to maintain said turbine at the set speed.

HAROLD E. REICHERT.

References Cited in the file of this patent
UNITED STATES PATENTS

| Number | Name | Date |
| --- | --- | --- |
| 2,193,114 | Seippel | Mar. 12, 1940 |
| 2,263,705 | Seippel | Nov. 25, 1941 |
| 2,336,232 | Doran | Dec. 7, 1943 |
| 2,432,177 | Sedille | Dec. 9, 1947 |
| 2,438,663 | Greenland | Mar. 30, 1948 |
| 2,441,948 | Atkinson | May 25, 1948 |
| 2,479,813 | Chamberlin | Aug. 23, 1949 |
| 2,510,753 | Multhaup | June 6, 1950 |
| 2,514,674 | Schorn | July 11, 1950 |
| 2,545,815 | Klinge | Mar. 20, 1951 |
| 2,558,866 | May et al. | July 3, 1951 |
| 2,636,130 | James | Apr. 21, 1953 |